United States Patent [19]
Chase, Jr.

[11] Patent Number: 5,760,569
[45] Date of Patent: Jun. 2, 1998

[54] REPLACEABLE BATTERY MODULE FOR ELECTRIC VEHICLE

[76] Inventor: Robert B. Chase, Jr., 4553 Orchard Ave., San Diego, Calif. 92107

[21] Appl. No.: 806,852

[22] Filed: Feb. 26, 1997

[51] Int. Cl.⁶ ........................................ H01M 10/46
[52] U.S. Cl. ........................ 320/104; 320/110; 414/281; 104/34
[58] Field of Search .................... 320/2, 5, 104, 320/109, 110, 111, 112; 414/281, 282, 283, 284, 285, 286; 104/34

[56] References Cited

U.S. PATENT DOCUMENTS

| | | | |
|---|---|---|---|
| 4,450,400 | 5/1984 | Gwyn | 320/2 |
| 5,187,423 | 2/1993 | Marton | 320/2 |
| 5,360,307 | 11/1994 | Schemm et al. | 320/2 X |
| 5,373,910 | 12/1994 | Nixon | 104/34 X |
| 5,542,488 | 8/1996 | Nixon | 104/34 X |
| 5,549,443 | 8/1996 | Hammerslag | 320/2 X |
| 5,612,606 | 3/1997 | Guimarin et al. | 320/2 |

*Primary Examiner*—Edward Tso
*Attorney, Agent, or Firm*—John L. Rogitz

[57] ABSTRACT

A system for "refueling" an electric vehicle includes a traction battery on a tray that is slidably disposed in a battery compartment of the vehicle and that is electrically connected to the traction motor of the vehicle. When the battery is depleted, the vehicle stops at an energy replenishment center which stores charged replacement traction batteries. The traction battery is electrically disengaged from the motor and the tray in the vehicle is slid out of the vehicle onto a dolly or into a receptacle of a carousel. Then, the replacement battery tray, which is disposed on another dolly or in another receptacle of the carousel, is juxtaposed with the battery compartment and slid into the compartment. Next, the fresh battery is electrically engaged with the motor, and the vehicle quickly resumes its journey. The depleted battery is recharged at the energy replenishment center and reused on a subsequent vehicle.

17 Claims, 2 Drawing Sheets

5,760,569

1

REPLACEABLE BATTERY MODULE FOR ELECTRIC VEHICLE

FIELD OF THE INVENTION

The present invention relates generally to electric vehicles, and more particularly to methods and systems for quickly "refueling" electric vehicles.

BACKGROUND

Electrically-powered vehicles hold the promise of reducing hydrocarbon pollution that would otherwise be exhausted into the atmosphere by conventional vehicles powered by fossil fuels. The principal drawbacks of electric vehicles, however, are the relatively low energy capacity of the electric power plant (usually one or more traction batteries) as compared to a fossil fuel power plant, and the excessive length of time required to recharge to a battery-based power plant, as compared to the length of time to refuel a fossil fuel-powered vehicle.

Current efforts to provide high capacity advanced batteries do not effectively address the above-noted problems. This is because such advanced batteries are generally relatively expensive, and the gains in capacity vis-a-vis current batteries tend to be incremental. Moreover, advanced batteries, like all batteries, require a relatively long time to recharge, owing to the inherent limitations of chemical-based electric power sources.

As recognized by the present invention, the nuisance of low energy capacity of vehicle traction batteries is likely to remain an ongoing concern, but the nuisance of lengthy recharging periods can be addressed effectively, using current battery technology, as disclosed herein. Accordingly, it is an object of the present invention to provide a system and method for quickly "refueling" an electric vehicle. Another object of the present invention is to provide a system and method for quickly "refueling" an electric vehicle that is easy to use and cost-effective.

SUMMARY OF THE INVENTION

A battery module includes a tray configured for holding one or more vehicle traction batteries thereon. The module also includes at least one positive conductor and at least one negative conductor, both of which are electrically connected to the traction batteries and both of which are movable with the tray. With this structure, the tray can be advanced into a battery compartment of an electric vehicle to thereby engage the conductors with complementarily-configured conductors on the vehicle. Consequently, electrical connectivity is established between the traction batteries and an electric propulsion system on the vehicle.

Preferably, the conductors are metal bars. In the preferred embodiment, the tray has opposed ends, and at least one positive conductor respectively protrudes from each end, such that the tray can be advanced into the compartment of the vehicle either end first.

If desired, a carousel is provided that holds plural battery trays on a movable conveyor. The carousel includes a charger for charging batteries in the replacement trays off-lines. Also, the carousel includes a computer with credit card reader for receiving a consumer's credit card therein to operate the carousel.

Alternatively to the carousel, a rollable dolly can be provided for holding the tray. The tray is postionable on the dolly and movable relative thereto, such that the dolly can be pushed by a person to the vehicle with the tray juxtaposed with the compartment and then the tray can be pushed off the dolly into the compartment by the person. To guide the tray in and out of the vehicle, opposed guide channels are formed in the compartment of the vehicle for slidably receiving the tray therein to guide the tray into the compartment and to guide the conductors into engagement with the connectors of the vehicle.

In another aspect, a method is disclosed for powering an electric vehicle having an electric propulsion system, a battery tray including at least one traction battery, and positive and negative traction battery connectors electrically connected to the battery. The battery tray is movably disposed in a battery compartment defined by the vehicle, and the inventive steps include stopping the vehicle, and then electrically disengaging the battery from the propulsion system. Next, the tray is slid out of the compartment onto a carrier that is juxtaposed with the vehicle. Moreover, the method includes juxtaposing, with the compartment, a replacement battery tray having at least one charged traction replacement battery. The replacement battery tray is slid into the compartment until the battery connectors of the vehicle are electrically connected to the replacement battery, at which point the replacement battery can be engaged with the propulsion system.

In yet another aspect, an electric vehicle includes an electric propulsion system, and positive and negative traction battery connectors electrically connected to the electric propulsion system. A compartment in the vehicle includes at least one guide channel. Additionally, a battery tray is slidably engaged with the guide channel, and at least one traction battery is supported by the battery tray. Positive and negative conductors are supported by the tray and are electrically connected to the traction battery.

The details of the present invention, both as to its structure and operation, can best be understood in reference to the accompanying drawings, in which like reference numerals, refer to like parts, and in which:

DETAILED DESCRIPTION OF THE PREFERRED EMBODIMENT

Figure 1:
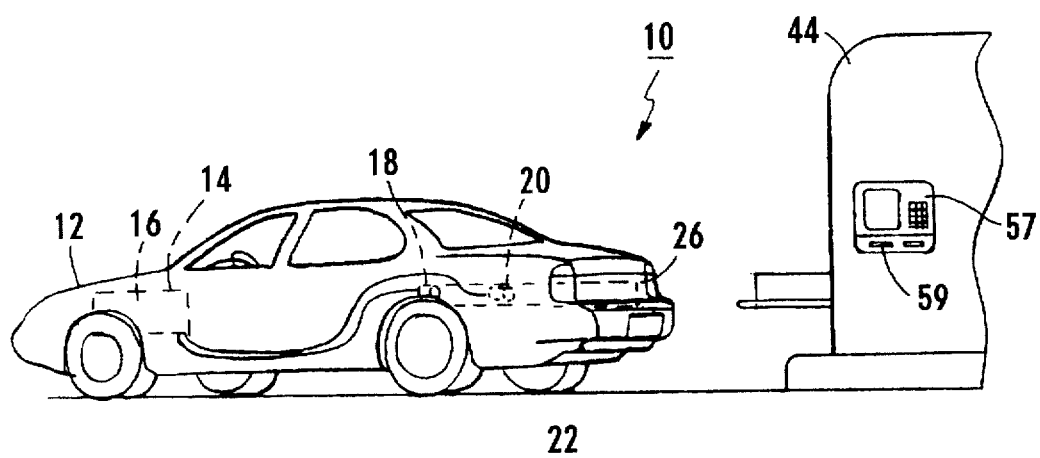
FIG. 1 is a perspective view of an electric vehicle parked next to a replenishment carousel, with portions of the vehicle shown in phantom.

Referring initially to FIG. 1, a system is shown, generally designated 10, which includes an electrically-propelled vehicle 12 having an electric propulsion system, generally designated 14. The electric propulsion system 14 includes an electric traction motor 16 that is coupled to one or both of the axles of the vehicle 12 to propel the vehicle 12. Positive and negative traction battery connectors 18, 20 are electrically connected to the electric propulsion system 14. In the preferred embodiment shown, the connectors 18, 20 are configured as hollow socket-like receptacles for receiving complementarily-shaped battery conductors, as more fully disclosed below.

Figure 2:
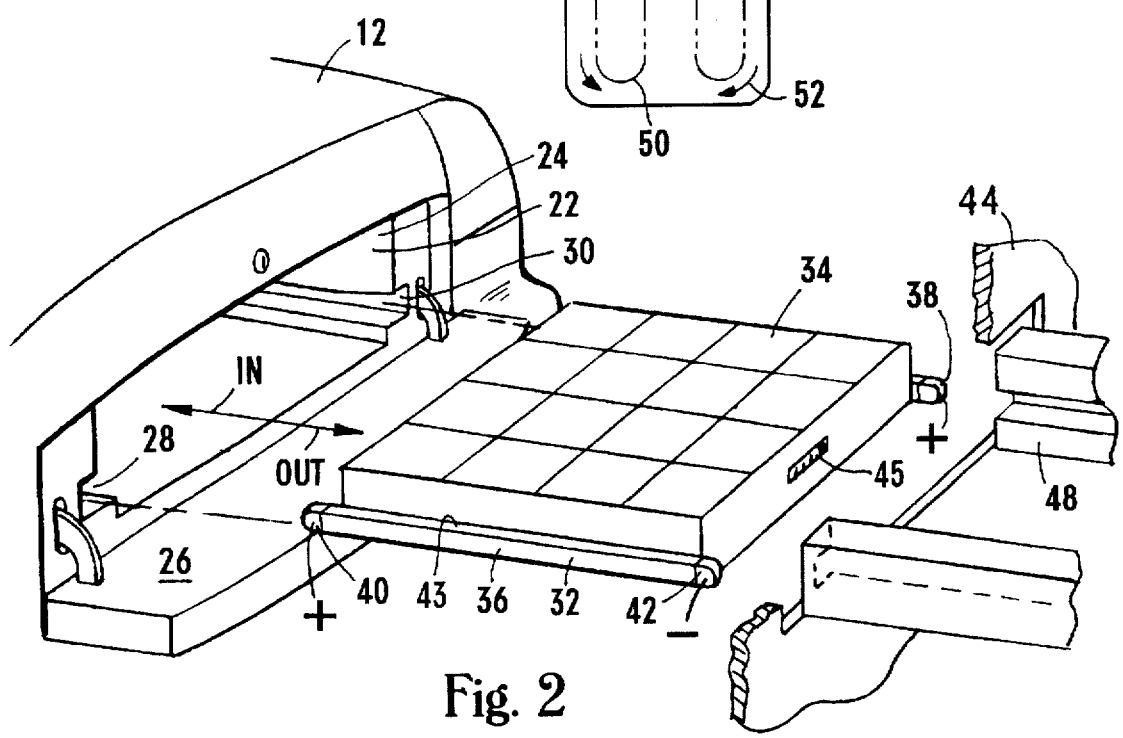
FIG. 2 is a perspective view of the battery tray juxtaposed with the battery compartment of the vehicle, with portions broken away for clarity.

In the presently preferred vehicle 12, in cross-reference to FIGS. 1 and 2, a hollow parallelepiped-shaped plastic-lined compartment 22 includes an open end 24 at the rear of the vehicle 12 as shown, and a door 26 is hingedly attached to the body of the vehicle 12 to selectively cover the open end 24 in accordance with vehicle door principles known in the art. As best shown in FIG. 2, left and right elongated longitudinally-oriented (with respect to the vehicle 12) guide channels 28, 30 are formed in the compartment 22. It is to be understood that when the traction battery tray disclosed below is fully advanced into the compartment 22, the door 26, when closed, is flush against the battery tray, to prevent longitudinal motion of the tray.

Inventively, a battery tray 32 is slidably engaged with the guide channels 28, 30. The battery tray 32 can be a hollow parallelepiped-shaped aluminum, steel, or plastic structure having continuous rectangular sides, or it can be a metal mesh, or rigid honeycomb-like structure that does not have continuous walls. In any case, the tray 32 is configured for supporting one or more vehicle traction batteries 34 as shown.

The poles of the one or more traction batteries 34 are electrically connected in parallel or in series by means known in the art to conductive terminal ends of first and second elongated rigid slides 36, 38. As shown in FIG. 2, the slides 36, 38 are connected to or are a part of the tray 32, and consequently the slides 36, 38 are movable with the tray 32.

Taking the first slide 36 as an example, it being understood that the second slide 38 is the mirror image thereof, the first slide 36 includes front and rear metal end conductors 40, 42 that protrude longitudinally beyond the tray 32 and that are connected to and flush with an insulated connecting rod 43. The front end conductor 40 is a positive terminal and the rear end conductor 42 is a negative terminal. In contrast, the front end conductor of the second slide 38 is a negative terminal and the rear end is a positive terminal.

Each end 40, 42 of the first conductor 36 is configured for closely engaging a respective connector 18, 20 of the vehicle 12 (depending on which end of the tray 32 is advanced first into the vehicle 12), such that electrical contact is firmly made between the end 40, 42 of the conductor 36 and connector 18, 20. The end terminals of the second conductor 38 likewise engage the connectors 20, 18 of the vehicle 12. With this structure, two of the four end terminals of the conductors 36, 38 can engage the connectors 18, 20 regardless of which end of the tray 32 is advanced into the vehicle 12. As can be appreciated in reference to FIG. 2, the conductors 36, 38 also undertake the function of slidably engaging the guide rails 28, 30 of the compartment 22.

Figure 3:
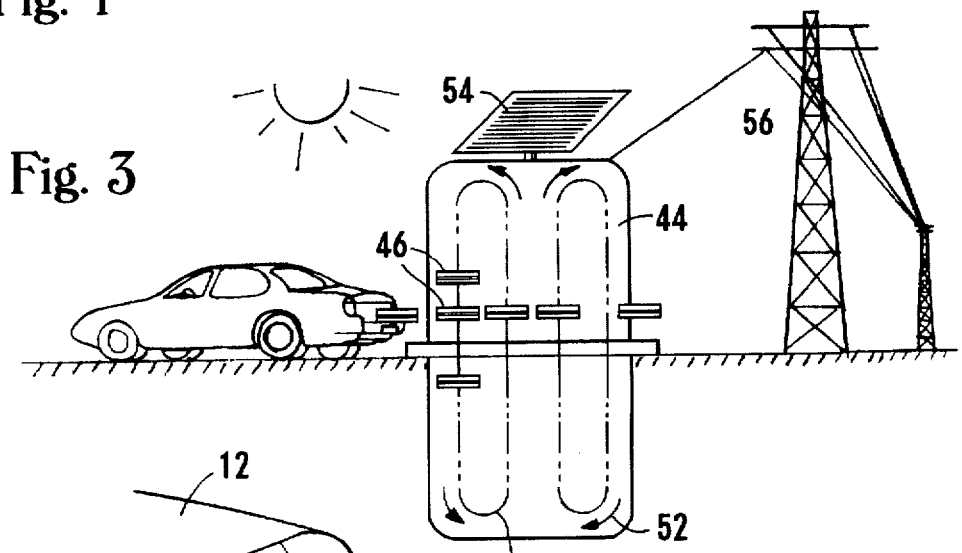
FIG. 3 is a partially schematic view of the replenishment carousel.

Referring to FIGS. 1 and 3, in the preferred embodiment, when the batteries 34 are depleted as might be indicated by, e.g., a charge indicator 45 that is attached to the tray 32 and electrically connected to the traction batteries 34, the vehicle 12 is moved adjacent a carousel 44. The carousel 44 has plural receptacles 46, some of which are empty and some of which contain replacement trays with charged traction batteries that in all essential respects are identical to the tray 32 with batteries 34. The vehicle 12 is stopped with its compartment 22 juxtaposed with the carousel 44, and the traction batteries 34 disengaged from the propulsion system 14 of the vehicle 12. Then, the tray 32 is slid out of the compartment 22 onto a carrier 48 (FIG. 2) of the carousel 44 as indicated by the arrow "OUT". It is to be understood that the height of the carrier 48 above the ground is established to be the same as the elevation of the bottom of the compartment 22, such that the battery tray 32 can be easily slid onto the carrier 48 from the compartment 22.

As shown schematically in FIG. 3, the receptacles 46 of the carousel 44 are on vertically-moving motor-driven belt conveyors 50 that can be moved in the directions indicated by the arrows 52. Accordingly, once the tray 32 has been slid into a previously empty receptacle 46 of the carousel 44 by means of the carrier 48, the conveyors 50 can be moved to juxtapose a receptacle 46 having a replacement tray therein with the compartment 22 of the vehicle 12. The replacement battery tray is then slid into the compartment 22 as indicated by the arrow "IN" until the battery connectors 18, 20 of the vehicle 12 are electrically connected to the replacement battery by means of the conductors of the replacement tray. The replacement battery can then be electrically engaged with the propulsion system 14.

As can be appreciated in reference to FIG. 3, while battery trays are in the receptacles 46 of the carousel 44, the traction batteries on the trays can be recharged. More specifically, the traction batteries in the receptacles 46 can be electrically connected to a charger, such as a solar panel 54 that is on or near the carousel 44, or to electric power lines 56. In this way, the batteries can be recharged "off-line" for reuse with subsequent electric vehicles, without requiring the vehicle drivers to wait prolonged periods during the charging as would otherwise be required. Desirably, as best shown in FIG. 1 the carousel 44 includes a computer 57 with credit card reader 59 for receiving a consumer's credit card therein to operate the carousel 44.

Figure 4:
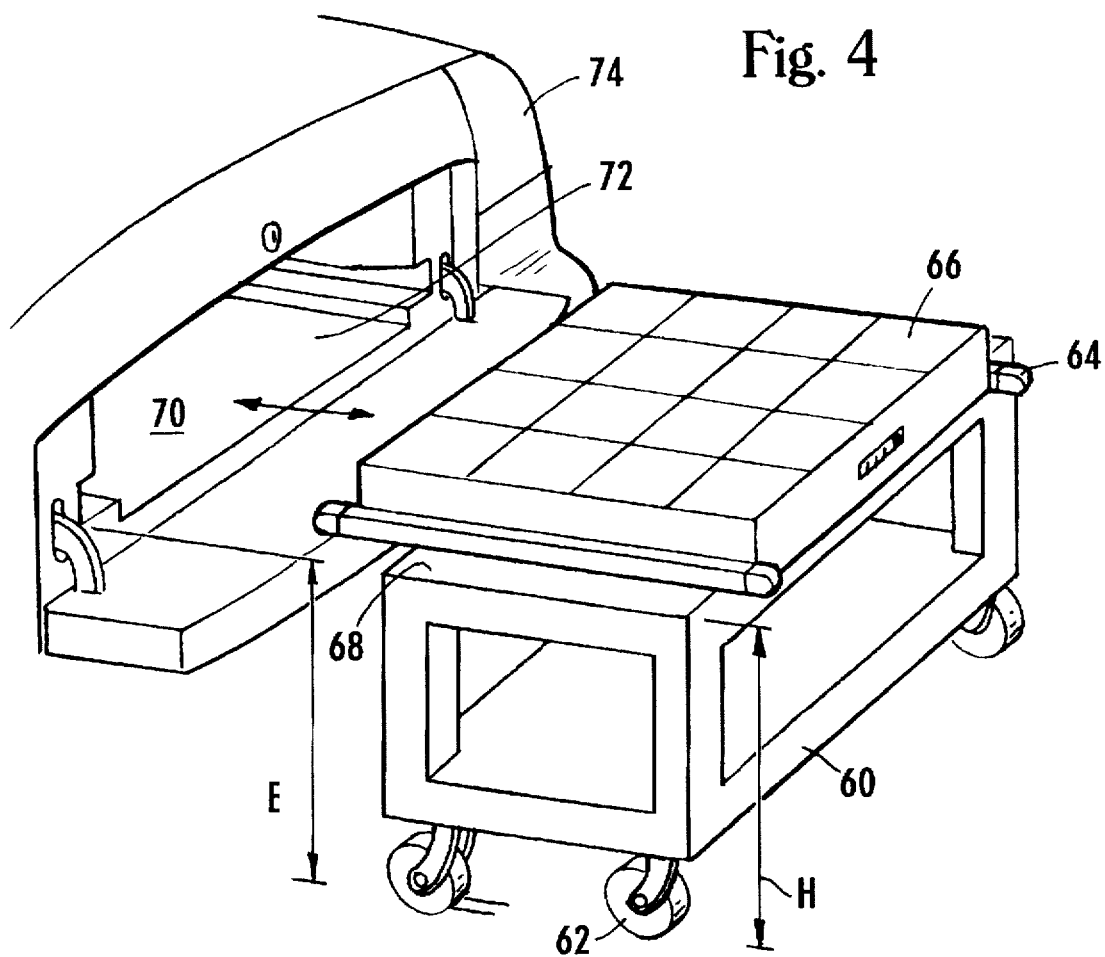
FIG. 4 is a perspective view of an alternate embodiment, showing the battery tray being wheeled up to an electric vehicle on a dolly.

FIG. 4 shows that in an alternate embodiment, the carrier of the present can be a manually pushable dolly 60 having wheels or rollers 62. A battery tray 64 with traction batteries 66 can be slid onto the top surface 68 of the dolly 60, with the height "H" of the top surface 68 being equal to the height "E" of the bottom 70 of a battery compartment 72 in an electric vehicle 74. With this structure, a person can wheel an empty dolly up to the compartment 72, slide out a depleted traction battery tray onto the dolly 60, roll the dolly 60 away, and roll up to the compartment 72 another like dolly having a charged traction battery tray thereon. The new battery tray can be slid into the compartment 72 to quickly and easily "refuel" the vehicle 74.

Figure 5:
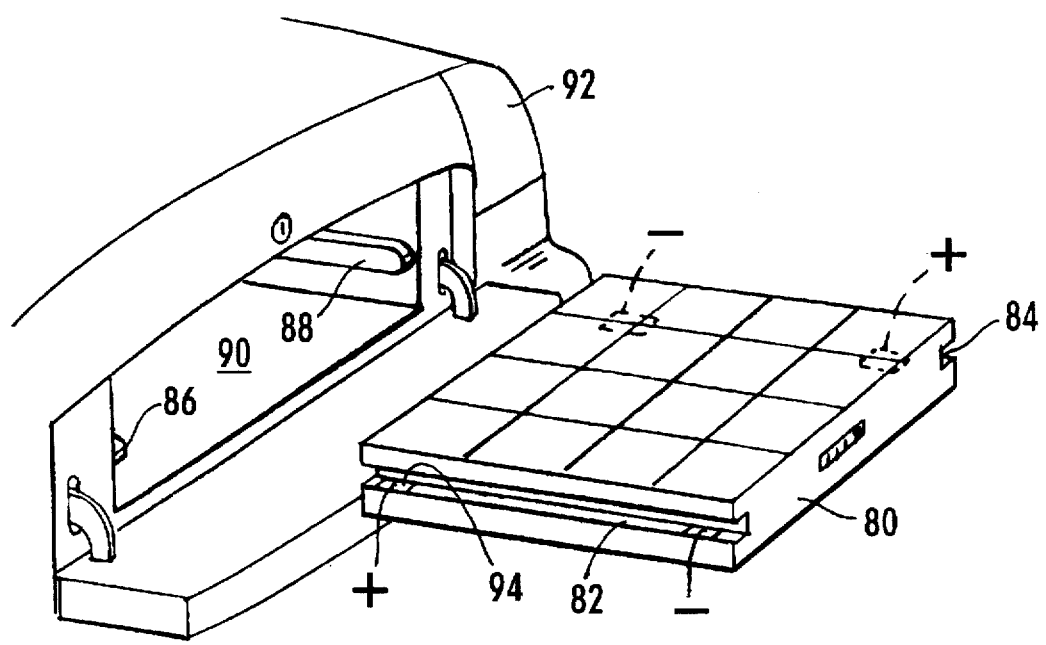
FIG. 5 is a perspective view of an alternate battery tray in juxtaposition with a vehicle.

FIG. 5 shows that a battery tray 80 can have longitudinal channels 82, 84 formed in the sides thereof for slidably engaging respective rails 86, 88 in a battery compartment 90 of a vehicle 92. Metal plates 94 are embedded in the channels 82, 84 and electrically connected to the traction batteries of the tray 80 to establish positive and negative terminals as indicated in FIG. 5. When the tray 80 is fully advanced into the compartment 90, two of the four plates 94 (one positive, one negative on the inserted end of the tray 80) contact complementarily-configured connectors (not shown) in the vehicle 92 that in turn are electrically connected to the electric traction system of the vehicle 92. The system shown in FIG. 5 is in all other essential respects identical to the system shown in FIG. 2.

While the particular SYSTEM AND METHOD FOR POWERING ELECTRIC VEHICLES as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A battery module for engaging a battery compartment of a vehicle, comprising:

a tray configured for holding one or more vehicle traction batteries thereon, the tray having a first end and a second end; and at least two positive conductors opposed from each other and protruding from respective ends of the tray and at least two negative conductors opposed from each other and protruding from respective ends of the tray, the conductors being electrically connected to the traction batteries and movable with the tray, such that the tray can be advanced either end first into a battery compartment of an electric vehicle to thereby engage the conductors with complementarily-configured conductors on the vehicle, such that electrical connectivity is established between the traction batteries and an electric propulsion system on the vehicle.

2. The module of claim 1, wherein the conductors are metal bars protruding beyond an end of the tray.

3. The module of claim 1, in combination with a carousel, the carousel holding plural battery trays on a movable conveyor.

4. The module of claim 3, wherein the carousel includes a charger for charging batteries.

5. The module of claim 1, in combination with a translationally rollable dolly, the tray being postionable on the dolly and movable relative thereto, such that the dolly can be pushed by a person to the vehicle with the tray juxtaposed with the compartment and then the tray can be pushed off the dolly into the compartment by the person.

6. The module of claim 1, in combination with a vehicle.

7. The module of claim 6, wherein the vehicle includes opposed guides for slidably receiving the tray therein to guide the tray into the compartment and to guide the conductors into engagement with the connectors of the vehicle.

8. The module of claim 3, wherein the carousel includes a computer with credit card reader for receiving a consumer's credit card therein to operate the carousel.

9. An electric vehicle, comprising:

an electric propulsion system;

positive and negative traction battery connectors electrically connected to the electric propulsion system;

a compartment including at least one guide;

a battery tray slidably engaged with the guide;

at least one traction battery supported by the battery tray; and positive and negative conductors supported by the tray and electrically connected to the traction battery.

10. The vehicle of claim 9, wherein the conductors are movable with the tray, such that the tray can be advanced into a battery compartment of an electric vehicle to thereby engage the conductors with the connectors.

11. The vehicle of claim 9, wherein the conductors are metal bars.

12. The vehicle of claim 9, in combination with a carousel, the carousel holding plural battery trays on a movable conveyor.

13. The vehicle of claim 12, wherein the carousel includes a charger for charging batteries.

14. The vehicle of claim 9, in combination with a rollable dolly, the tray being postionable on the dolly and movable relative thereto, such that the dolly can be pushed by a person to the vehicle with the tray juxtaposed with the compartment and then the tray can be pushed off the dolly into the compartment by the person.

15. The vehicle of claim 13, wherein the carousel includes a computer with credit card reader for receiving a consumer's credit card therein to operate the carousel.

16. The vehicle of claim 12, wherein the carousel includes at least one solar panel.

17. The vehicle of claim 12, wherein the carousel includes plural battery receptacles for holding batteries, each and every receptacle being movable on at least one motor-driven belt conveyor.

* * * * *